United States Patent
Apfel

(10) Patent No.: US 8,019,077 B2
(45) Date of Patent: *Sep. 13, 2011

(54) METHODS AND APPARATUS FOR LOW VOLTAGE CONTROL OF A SUBSCRIBER LINE INTERFACE CIRCUIT

(75) Inventor: Russell J. Apfel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1265 days.

This patent is subject to a terminal disclaimer.

(21) Appl. No.: 11/646,057

(22) Filed: Dec. 27, 2006

(65) Prior Publication Data

US 2008/0159487 A1 Jul. 3, 2008

(51) Int. Cl.
*H04M 1/00* (2006.01)
*H04M 9/00* (2006.01)

(52) U.S. Cl. ....................................................... 379/413
(58) Field of Classification Search .................... 379/413
See application file for complete search history.

(56) References Cited

U.S. PATENT DOCUMENTS

| | | | | |
|---|---|---|---|---|
| 4,197,435 | A | * | 4/1980 | Jackson et al. ................. 379/2 |
| 4,323,734 | A | * | 4/1982 | Kimzey ......................... 379/162 |
| 4,600,811 | A | | 7/1986 | Hayashi et al. |
| 5,596,637 | A | * | 1/1997 | Pasetti et al. ............. 379/399.02 |
| 5,619,567 | A | | 4/1997 | Apfel ............................ 379/413 |
| 5,737,411 | A | | 4/1998 | Apfel ............................ 379/413 |
| 5,854,839 | A | | 12/1998 | Chen et al. |
| 5,881,129 | A | | 3/1999 | Chen et al. |
| 6,320,467 | B1 | | 11/2001 | Hallen |
| 6,351,528 | B1 | | 2/2002 | Apfel ............................ 379/377 |
| 6,356,624 | B1 | | 3/2002 | Apfel ......................... 379/27.01 |
| 6,476,753 | B1 | | 11/2002 | Hansen et al. |
| 6,566,957 | B1 | | 5/2003 | Caine |
| 6,735,302 | B1 | | 5/2004 | Caine et al. |
| 6,778,663 | B1 | | 8/2004 | Schopfer |
| 6,934,384 | B1 | | 8/2005 | Hein et al. ................ 379/399.02 |
| 6,956,945 | B2 | | 10/2005 | Apfel ............................ 379/413 |
| 7,113,590 | B2 | | 9/2006 | Apfel ....................... 379/399.01 |
| 7,116,778 | B2 | | 10/2006 | Eckhoff et al. .......... 379/399.01 |
| 2003/0072436 | A1 | | 4/2003 | Eckhoff et al. .......... 379/399.01 |
| 2004/0258183 | A1 | | 12/2004 | Popescu et al. |
| 2005/0024143 | A1 | | 2/2005 | Humphrey |
| 2006/0115076 | A1 | * | 6/2006 | Enriquez et al. ......... 379/399.01 |

OTHER PUBLICATIONS

U.S. Patent and Trademark Office, Office Action dated Nov. 12, 2009 with Reply filed on Nov. 12, 2010 in U.S. Appl. No. 11/453,417.
U.S. Appl. No. 11/453,418, filed Jun. 15, 2006, entitled, "An Output Stacking Architecture for an Amplifier," by Russell J. Apfel and Richard B. Webb.
U.S. Appl. No. 11/453,702, filed Jun. 15, 2006, entitled, "Current Mirror Architectures," by Russell J. Apfel.

(Continued)

*Primary Examiner* — Alexander Jamal
(74) *Attorney, Agent, or Firm* — Trop, Pruner & Hu, P.C.

(57) ABSTRACT

In one embodiment, the present invention includes a device having a low voltage SLIC to perform SLIC functions at a low voltage and to provide metallic and longitudinal currents to a high voltage SLIC. The low voltage SLIC may be designed based on an operational amplifier cell architecture, and the high voltage SLIC may receive the metallic and longitudinal currents and generate first and second amplified output currents therefrom.

21 Claims, 13 Drawing Sheets

OTHER PUBLICATIONS

U.S. Appl. No. 11/453,417, filed Jun. 15, 2006, entitled, "Methods and Apparatus for Performing Subscriber Line Interface Functions," by Russell J. Apfel.

U.S. Appl. No. 11/645,878, filed Dec. 27, 2006, entitled, "A Tracking Voltage Regulator for a Subscriber Line Interface Circuit," by Russell J. Apfel.

Silicon Laboratories, "Si3220/25 Dual ProSLIC," Oct. 2001, pp. 1-2.

Silicon Laboratories, "Si324x/Si3205 Quad ProSLIC Programmable CMOS SLIC/Codec," Sep. 22, 2005, pp. 1-2.

U.S. Patent and Trademark Office, Office Action dated May 26, 2010, in U.S. Appl. No. 11/453,417.

U.S. Patent and Trademark Office, Office Action dated Jun. 9, 2010, in U.S. Appl. No. 11/453,418.

U.S. Patent and Trademark Office, Final Office Action mailed Oct. 22, 2010 with Reply filed on Dec. 23, 2010 in U.S. Appl. No. 11/453,418.

* cited by examiner

METHODS AND APPARATUS FOR LOW VOLTAGE CONTROL OF A SUBSCRIBER LINE INTERFACE CIRCUIT

FIELD OF THE INVENTION

Embodiments of the present invention relate to telecommunications, and more particularly to subscriber line interface circuitry for telecommunication systems.

BACKGROUND

Subscriber line interface circuits (SLICs) are often present in a central office exchange of a telecommunications network or remote locations thereto for use in providing a communication interface between a digital switching network of a central office and an analog subscriber line. The analog subscriber line connects to a subscriber station or telephone instrument at a location that is remote from the central office exchange.

The analog subscriber line and subscriber equipment (e.g., a telephone) form a subscriber loop. The interface requirements of a SLIC typically require high voltages and currents for control signaling with respect to the subscriber equipment on the subscriber loop. Voiceband communications are typically low voltage analog signals on the subscriber loop. Accordingly, the SLIC performs various functions with respect to voiceband and control signaling between the subscriber equipment and the central exchange.

SLIC functionality has generally been implemented in multiple integrated circuits (ICs), or combinations of ICs and discrete elements. Typically, significant high voltage circuitry is included in one IC to provide various high voltage functionality of a SLIC. Accompanying low voltage IC's are used to perform control functions for the high voltage portion and also to perform low voltage tasks, voice signal processing, and to provide an interface to system circuitry, e.g., a system on a chip (SOC) such as a digital signal processor (DSP) or other digital processing circuit of a central office or similar location. In turn, the DSP is coupled to provide system input/output (I/O) signals to other locations in the telecommunications network. In other implementations, instead of a DSP interface, the SLIC may couple directly into a switching system.

Typically, a significant number of wires or signal lines are used to connect low voltage portions of a SLIC with the high voltage portion. Furthermore, different SOCs or DSPs used in a system can require different information from a SLIC. That is, different DSPs have different capabilities with respect to signal processing. Some DSPs include capabilities for analog signal processing such as codec functionality and filtering, while other DSPs strictly handle digital signal processing for system requirements such as code compression, call processing, echo cancellation, among others. Accordingly, different SLIC configurations are needed to interface with different DSPs.

These different SLIC configurations typically require completely different designs, often in different process technologies. Such different designs are not readily reused across different process technologies and different SLIC configurations. Another limitation with respect to SLIC design is that because of the criticalities of the different low voltage and high voltage components, it is typically difficult to port a given design across different process technologies. Thus, a SLIC design implemented in one process technology is not easily ported to another technology, owing to differences in device characteristics. This typically requires the need for significant calibration, trimming and other design-intensive matching of devices.

SUMMARY OF THE INVENTION

In one aspect, the present invention includes an apparatus having a low voltage subscriber line interface circuit (SLIC) to control SLIC functions at a low voltage. The low voltage SLIC may include a voltage detection circuit having a first pair of operational amplifiers each to receive one of a tip and ring voltage of a subscriber loop and output a scaled version, and a second pair of operational amplifiers each coupled to receive the scaled versions of the tip and ring voltages and to generate an overvoltage signal if the tip or ring voltage is greater than a threshold. The low voltage SLIC may further include a longitudinal voltage controller having a first operational amplifier to receive the scaled versions of the tip and ring voltages at a first input and a scaled battery voltage at a second input. The low voltage SLIC may perform further functions such as fault signal generation, bias generation, and DC feed control, among others.

Another aspect is directed to a device including a low voltage SLIC to perform SLIC functions at a low voltage and to provide a metallic current and a longitudinal current to a high voltage SLIC. The low voltage SLIC may be designed based on an operational amplifier cell architecture. The high voltage SLIC may receive the metallic current and the longitudinal current and generate first and second amplified output currents from the metallic and longitudinal currents. To do this, the high voltage SLIC may include at least a pair of bidirectional current amplifiers formed of pairs of unidirectional current amplifiers.

Yet another aspect is directed to a system that includes a digital signal processor (DSP) and a high voltage SLIC. The DSP may perform signal processing on voiceband communication signals and may include a circuit block to perform low voltage SLIC functions via circuitry having an operational amplifier-based cell architecture. In turn, the high voltage SLIC may include first and second current amplifiers to amplify currents received from the circuitry via an analog interface.

DETAILED DESCRIPTION

In various embodiments, traditional functionality performed by SLIC circuitry may be implemented in various components in an effort to reduce component counts and reduce costs of manufacture. More specifically, various so-called BORSCHT functions, and more particularly low voltage BORSCHT functions may be provided in low voltage ICs, such as a DSP or other low voltage device. In different implementations, different amounts of SLIC functionality may be moved into such low voltage devices. These low voltage devices may include, in addition to DSPs, ICs for signal processing for voice over internet protocol (VoIP) or digital subscriber line (DSL) implementations. Example system implementations will be described below. Note that with respect to the system implementations shown, varying amounts of SLIC functionality can be off-loaded from a high voltage device to one or more low voltage devices.

Figure 1A:
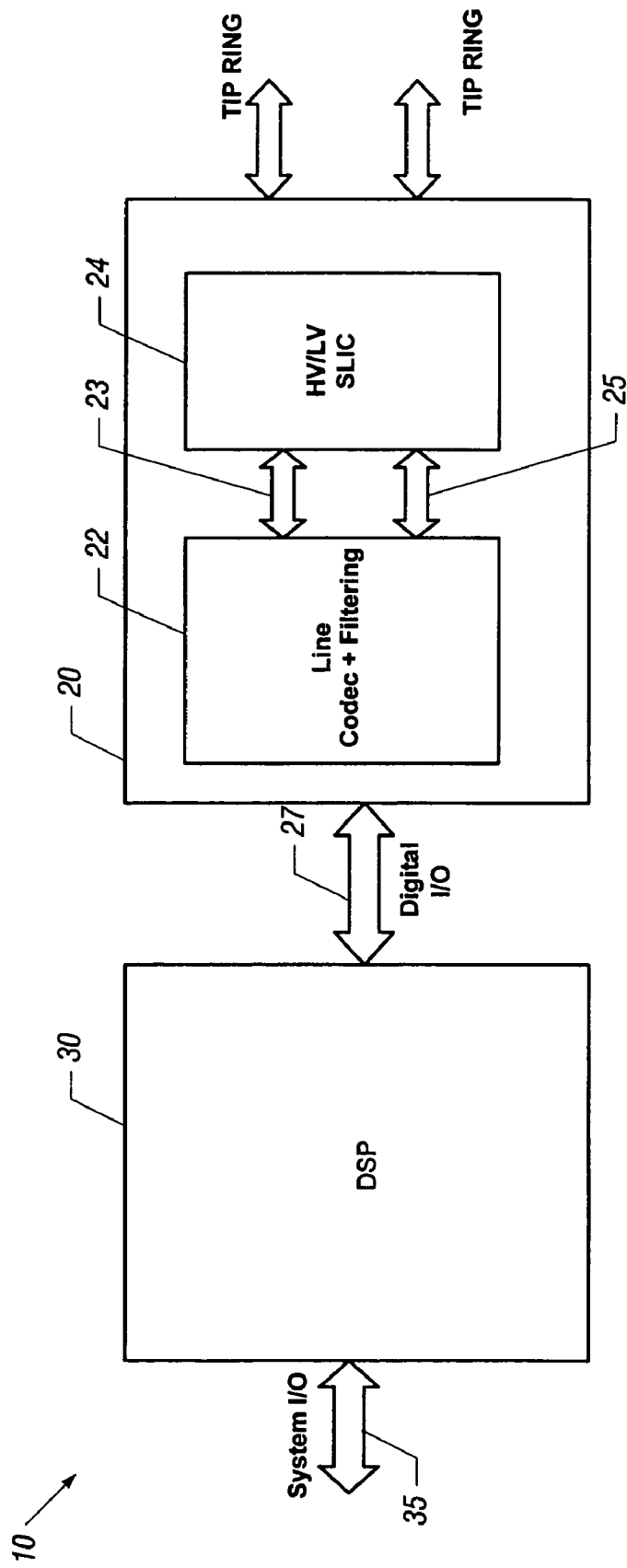
FIG. 1A is a block diagram of a system implementation in accordance with one embodiment of the present invention.

Referring now to FIG. 1A, shown is a block diagram of a system implementation in accordance with one embodiment of the present invention. As shown in FIG. 1A, system 10 may include a line card 20 that includes, for example, separate ICs including a line codec 22 and a SLIC 24 which may include both high voltage and low voltage SLIC functionality. Codec 22 may further perform filtering functions. These ICs may be coupled via a first interface 23 and a second interface 25, in which first interface 23 includes control signals while second interface 25 includes data signals. Line card 20 may be coupled to a subscriber line, e.g., via tip and ring lines. In the embodiment shown in FIG. 1A, multiple channels may be present in line card 20 such that line card 20 may interface with a first subscriber line via a first interface and a second subscriber line via a second interface.

In turn, line card 20 may be coupled via a digital I/O 27 to a DSP 30. DSP 30 may be a conventional DSP that performs only digital signal processing. Accordingly, all coding and decoding functions may be performed in line codec 22 and thus only digital signaling occurs over digital. I/O 27. DSP 30 may be coupled to other system components via a system I/O 35. While described with this particular implementation with regard to FIG. 1A, it is to be understood that the scope of the present invention is not so limited, and in other embodiments different manners of segmenting SLIC functionality between different devices of a system can be implemented. For example, in different implementations instead of an interface to DSP 30, a line card may interface directly with switching circuitry of a central office, e.g., via a backplane or other such connection. Also, in other implementations, more SLIC functionality may be moved to the codec-based IC.

Figure 1B:
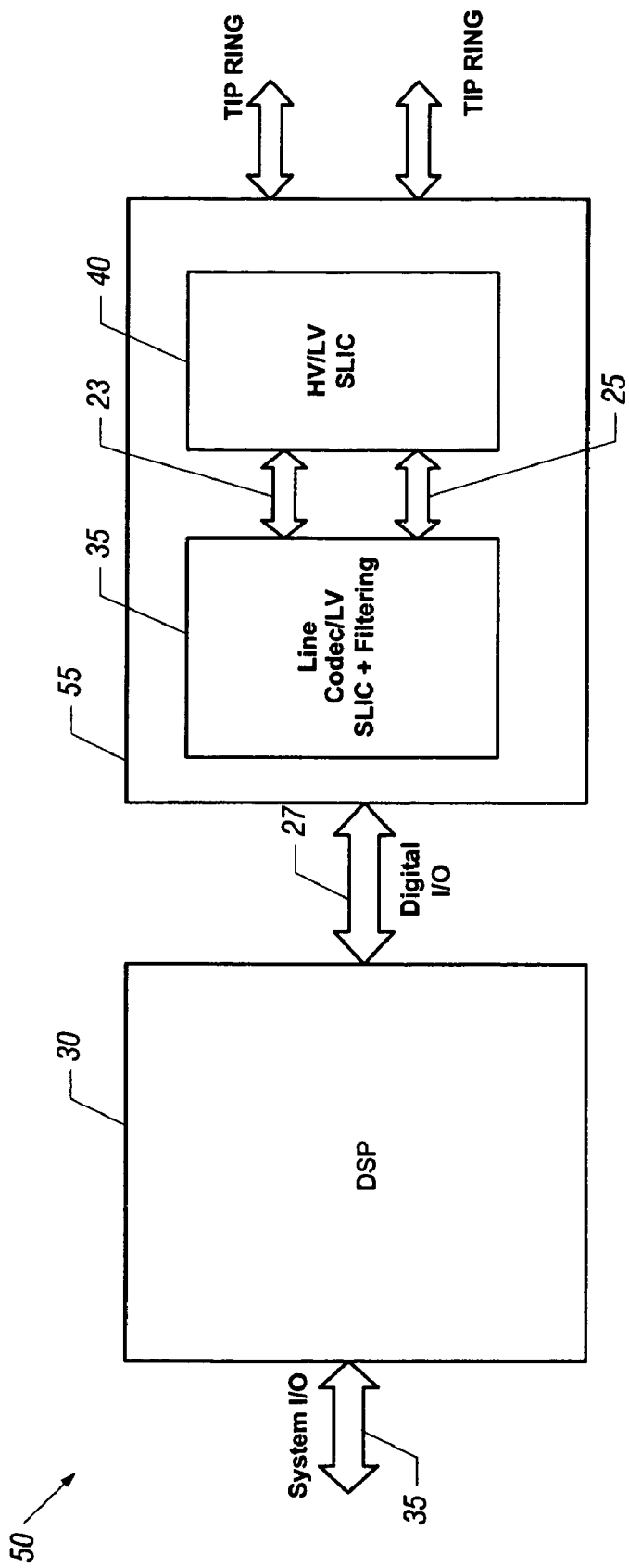
FIG. 1B is a block diagram of a system implementation in accordance with another embodiment of the present invention.

Thus referring now to FIG. 1B, shown is a block diagram of another system implementation in accordance with an embodiment of the present invention. As shown in FIG. 1B, system 50 may include a line card 55 that includes separate ICs, namely a codec/low voltage SLIC 35 and a high voltage/low voltage SLIC 40. In this system implementation, at least portions of the low voltage SLIC functionality is provided in IC 35, which further performs coding/decoding functions in addition to filtering. SLIC 40 includes the high voltage SLIC functionality, as well as at least a portion of low voltage SLIC functions. In this embodiment, reduced costs may be realized by moving at least some of these low voltages SLIC functions into IC 35, which is a low voltage IC. In other respects, system 50 may be adapted similarly as system 10 of FIG. 1A.

Figure 2:
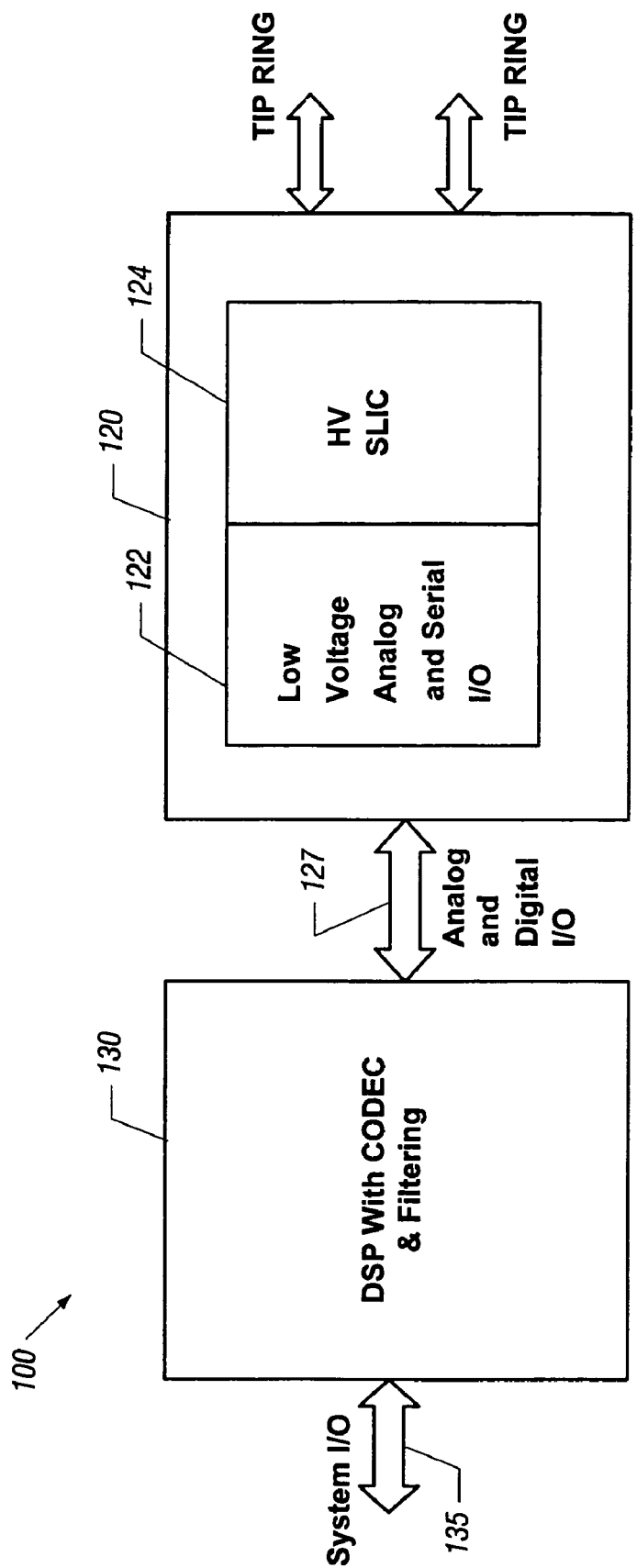
FIG. 2 is a block diagram of a system implementation in accordance with another embodiment of the present invention.

Referring now to FIG. 2, shown is a block diagram of a system implementation in accordance with another embodiment of the present invention. As shown in FIG. 2, system 100 includes a line card 120 that is coupled to a DSP 130. In this embodiment, DSP 130 includes codec functionality to receive analog signals and perform various coding operations on analog data (e.g., voiceband communications), as well as filtering. Thus in this embodiment, various functionality previously present in a line card can be performed in a DSP or other components to which a line card is coupled. For example in the embodiment shown in FIG. 2, codec and filter functionality may be incorporated into such a DSP or other component. Accordingly, a combined analog and digital I/O interface 127 couples line card 120 and DSP 130. Because of the different type of DSP used (as compared with FIG. 1), line card 120 may include different components than line card 20 of FIG. 1. Namely, line card 120 may include a high voltage SLIC 124 and a low voltage IC 122. Low voltage IC 122 may include control circuitry to implement low voltage analog and I/O interface functions. As further shown in FIG. 2, line card 120 is coupled to, e.g., two subscriber loops via first and second interfaces. In turn, DSP 130 is coupled to a remainder of a system via a system I/O interface 135. Accordingly, based on various system configurations and more particularly different DSPs with which a line card is coupled, different ICs or other circuitry to implement different functionality may be incorporated within a given line card.

Still further, in other embodiments a minimal amount of circuitry may be implemented within a line card or high voltage SLIC. To this end, various low voltage control and SLIC functionality that can be performed at a low voltage may be integrated within a system on a chip (SOC) or other such DSP. Accordingly, high voltage and other components of a line card may be reduced to a minimal portion, and coding functionality (among other such traditional SLIC functionality) may be implemented within a SOC.

Figure 3:
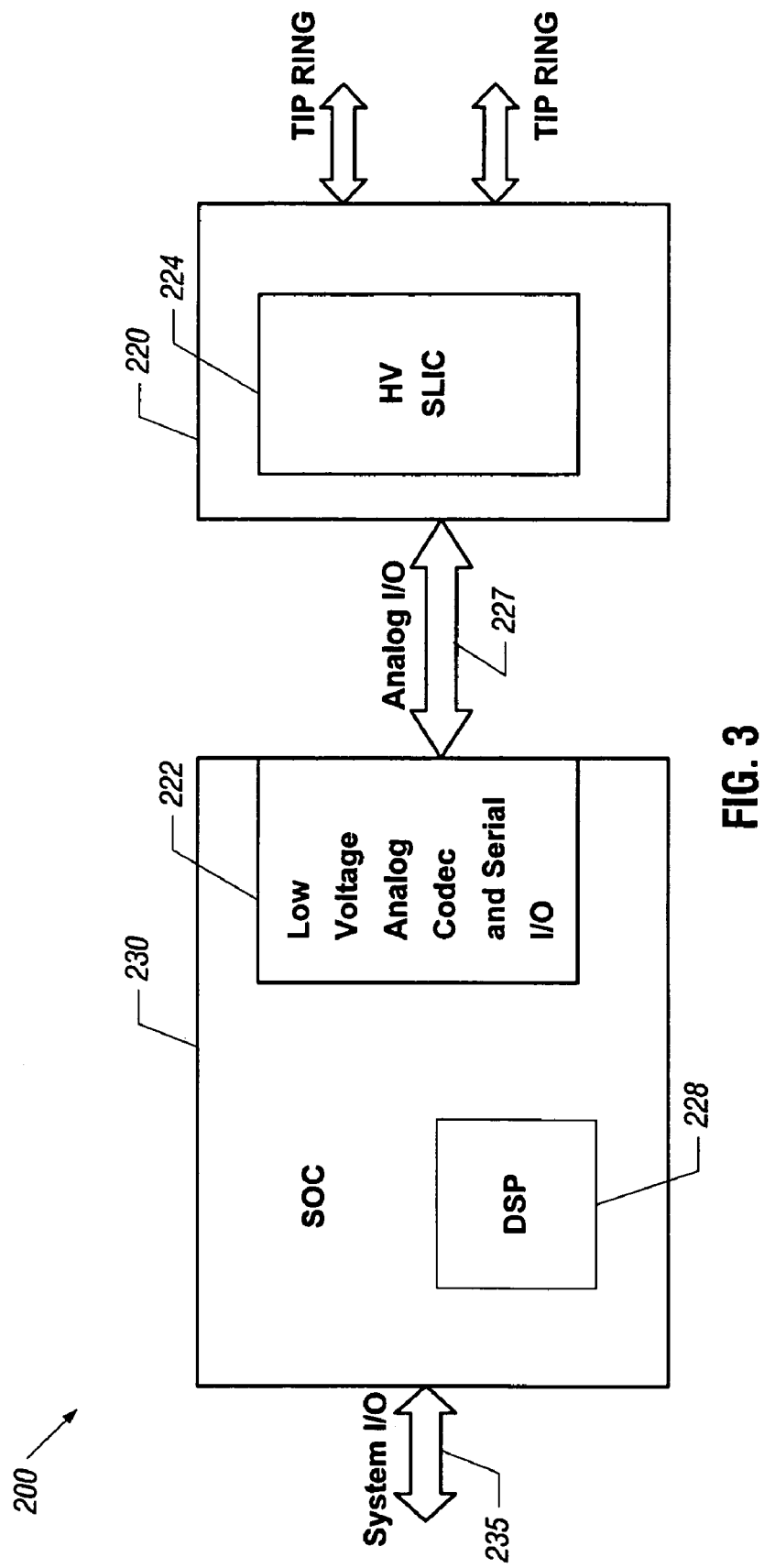
FIG. 3 is a block diagram of a system implementation in accordance with yet another embodiment.

Referring now to FIG. 3, shown is a block diagram of a portion of a system implementation in accordance with such an embodiment. As shown in FIG. 3, system 200 includes a line card 220 that includes a high voltage SLIC 224. Note that only a single IC is present within line card 220, thus reducing size and cost of the line card. Line card 220 acts as an interface to one or more subscriber loops, e.g., via tip and ring lines. In turn, line card 220 is coupled to a SOC 230 via an analog I/O 227. In various implementations, analog I/O interface 227 may include a minimal number of wires to handle a minimum amount of signaling needed between line card 220 and SOC 230. In one embodiment, a three-pin analog I/O interface may be implemented. These three analog pins, as will be discussed further below, may flow current of different values to represent different logic values to control operation of high voltage SLIC 224. In this way, the needed information to be passed between the high voltage and low voltage portions may be implemented using minimal connections. Further, because of the use of analog signals to represent different logic states, such an interface may be easily ported across process technologies.

Still referring to FIG. 3, SOC 230 includes a low voltage core 222 that handles interface functionality with high voltage SLIC 224, along with various low voltage SLIC functionality and codec functionality. In various implementations, core 222 may be implemented with a design, i.e., a process technology independent design that is easily ported across process technologies. For example, core 222 may be built using a number of operational amplifiers (op-amps) that are easily ported across process technologies without the need for precision matching or other trimming or calibration functions. By basing a design on an op-amp structure, requirements may be kept relatively simple. For example, precision of the design may be based on matching resistors. Since virtually all IC technologies include a device or structure that can provide matched resistors, such matching may be nominally achieved. That is, in many technologies, resistor matching of approximately 0.1% may be achieved with minimal effort. Because implementations may implement resistor matching in the range of approximately 0.5%, such matching requirements can be handily met. As will be described further below, various designs may further include analog switches and diodes that may be present in most technologies. Accordingly, embodiments may provide low voltage control for SLIC circuitry in a cost effective manner, obtaining high precision with resistors as the only precision matched components of the design.

In various embodiments, core 222 may be a multi-channel core that can perform signal processing for multiple communication channels. Core 222 thus may be a generic core to handle low voltage SLIC functionality. As such, core 222 may be implemented in a design of a variety of DSPs or SOCs that are implemented in many different process technologies. For example, different SOCs may be implemented using different CMOS process technologies of different technology nodes. Or other process implementations such as bipolar, BiCMOS, DMDMOS, or other process technology may be used. In addition to core 222, SOC 230 further includes conventional DSP circuitry 228 to perform various signal processing functions. Accordingly, SOC 230 communicates with a remaining portion of a system via a system I/O interface 235.

Note that because the circuitry to implement core 222 may be based on an easily portable design, it may be possible to provide core 222 as an independent design capable of being implemented within different DSPs or SOCs of many different manufacturers. Accordingly, core 222, which may be designed by one entity, may be an independently licensable circuit design that can be readily accommodated to different process technologies of underlying SOC's of many different entities.

Figure 4:
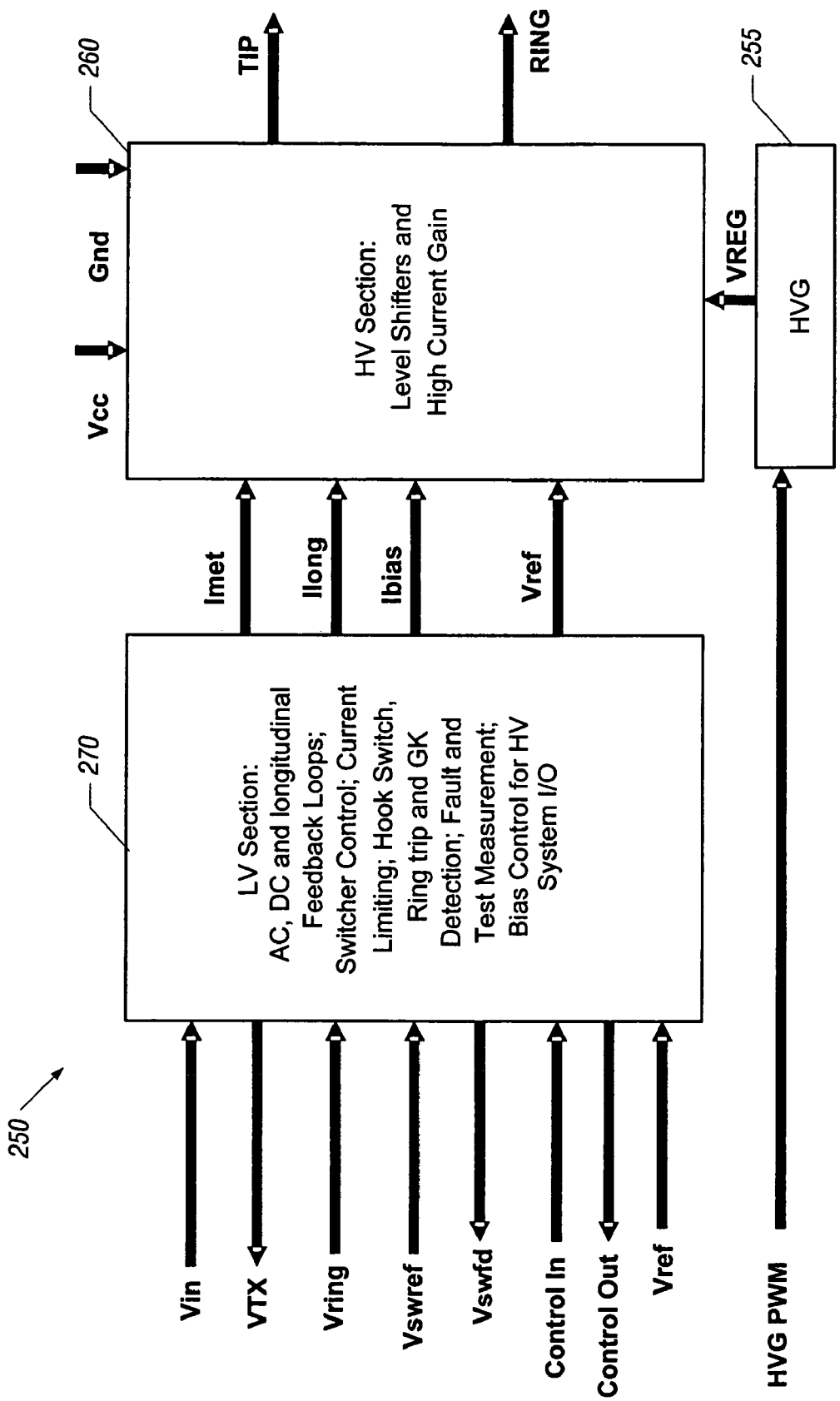
FIG. 4 is an example segmentation of functionality performed in high voltage and low voltage portions of a SLIC in accordance with an embodiment of the present invention.

In many implementations, a SLIC in accordance with an embodiment of the present invention may be designed such that as much control and functionality as possible is implemented in low voltage circuitry, thus reducing real estate and power consumption. Accordingly, only a minimal amount of circuitry is handled at high voltages. Referring now to FIG. 4, shown is an example segmentation of functionality performed in high voltage and low voltage portions of a SLIC 250 in accordance with an embodiment of the present invention. As shown in FIG. 4, SLIC 250 includes a low voltage portion 270 and a high voltage portion 260. Furthermore, a high voltage generator 255 is present and is coupled to provide a regulated voltage ($V_{REG}$) to high voltage portion 260. While shown as a separate component in the embodiment of FIG. 4, it is to be understood that high voltage generator 255 may be part of high voltage portion 260, or its functions may be split among low voltage portion 270 and high voltage portion 260. High voltage portion 260 is coupled to receive three analog signals, namely three analog currents from low voltage section 270. As shown in FIG. 4, these three signals include a metallic current ($I_{met}$), a longitudinal current ($I_{long}$) and a bias current ($I_{Bias}$), each of which will be discussed further below. Furthermore, a reference voltage may be provided from low voltage portion 270 to high voltage portion 260. High voltage portion 260 is further coupled to receive a supply voltage (i.e., $V_{cc}$) and a ground potential (i.e., GND).

Still referring to FIG. 4, low voltage portion 270 includes various circuitry to perform different functions, including AC/DC and longitudinal feedback control. Low voltage portion 270 may further include switching control, current limiting, hook switch, ring trip and ground key (GK) detection. Thus low voltage portion 270 includes feedback control loops to sense conditions at the SLIC outputs and provide control signals to high voltage portion 260. Furthermore, LV portion 270 includes fault and test measurement capabilities, along with bias control for high voltage portion 260, as well as an interface to a system I/O. To implement these functions, low voltage portion 270 may include various signal lines to interface with different portions of other system circuitry, e.g., a DSP. Accordingly, as shown in FIG. 4, different voltages and control signals may be provided to and from low voltage portion 270. While shown with this particular implementation in the embodiment of FIG. 4, it is to be understood that the scope of the present invention is not so limited. Low voltage portion 270 may be located in various physical locations in different embodiments. For example, in a system such as that shown in FIG. 2, low voltage portion 270 may be physically implemented as low voltage IC 122. In a system such as that shown in FIG. 3, low voltage portion 270 may be implemented within core 222 that is itself implemented within a SOC 230.

In turn, high voltage section 260 may interface with a subscriber loop, e.g., via tip and ring lines. High voltage section 260 may further include various circuitries to perform level shifting functions as well as to amplify the currents received from low voltage portion 270. For example, in one implementation one or more high current gain blocks may be implemented within high voltage portion 260. In one embodiment, the gain blocks may be formed of pairs of unidirectional current amplifiers that together form bidirectional current amplifiers having a gain of approximately 200, although the scope of the present invention is not so limited.

Figure 5:
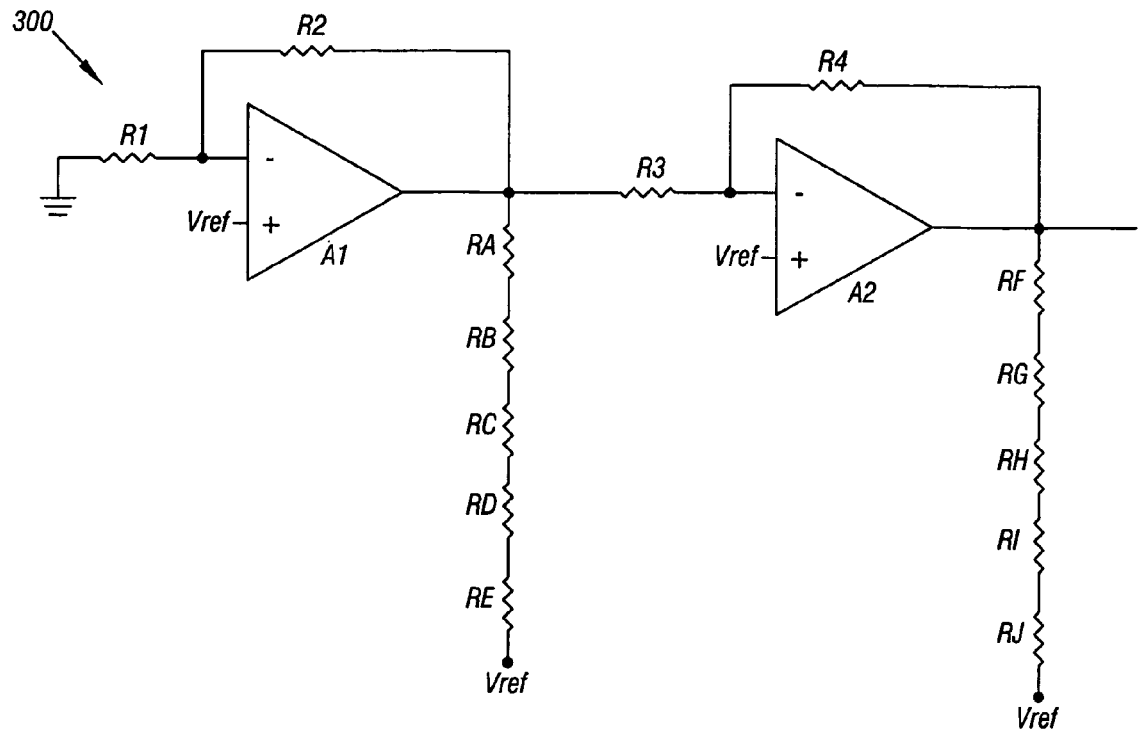
FIG. 5 is a schematic diagram of a low voltage bias generator in accordance with an embodiment of the present invention.

Referring now to FIG. 5, shown is a schematic diagram of a low voltage bias generator in accordance with an embodiment of the present invention. As shown in FIG. 5, bias generator 300 includes a pair of op-amps A1 and A2. Op-amp A2 has a negative input terminal coupled through a front-end resistor R1 to a ground potential, while the positive input terminal is coupled to a reference voltage, $V_{REF}$. In various embodiments, $V_{REF}$ may be a precision reference voltage (which may be approximately 1.25 V with about plus or minus 1% tolerance in one embodiment) that may be externally supplied or internally generated depending on a given implementation. A feedback resistor R2 is coupled between the output of op-amp A1 and the negative input terminal. A resistor string of resistors RA-RE may be coupled to the output of op-amp A1 to provide multiple sense points for different bias conditions. In the embodiment of FIG. 5, five such resistors RA-RE may be present to generate positive reference voltages of, for example, 0.2 V, 0.25 V, 0.40 V, 0.48 V, 0.7 V, and 0.85 V, referenced to $V_{REF}$. In some implementations, front end resistor R1 may be an external resistor to allow the reference voltages to track the on-chip sheet resistance. In one embodiment, R1 may be a 50 kΩ resistor, while R2 may be a 35.7 kΩ resistor.

The output of op-amp A1 is coupled through a resistor R3, which may be 50 kΩ, to the negative input terminal of op-amp A2, while the positive input terminal of op-amp A2 is coupled to the reference voltage, $V_{REF}$. In turn, a feedback resistor R4, which may be 42.5 kΩ, is coupled between the output of op-amp A2 and the negative input terminal. Another resistor string including resistors RF-RJ may be coupled to the output to provide a plurality of negative reference voltages, e.g., −0.05 V, −0.2 V, −0.25 V, −0.40 V, −0.48 V, −0.7 V, and −0.85 V with reference to $V_{REF}$. Note that these on-chip resistor strings may thus provide numerous sense points for different bias conditions. The reference voltages enabled by bias generator 300 may be connected to high impedance op-amp inputs, e.g., via analog switches to prevent loading.

Figure 6:
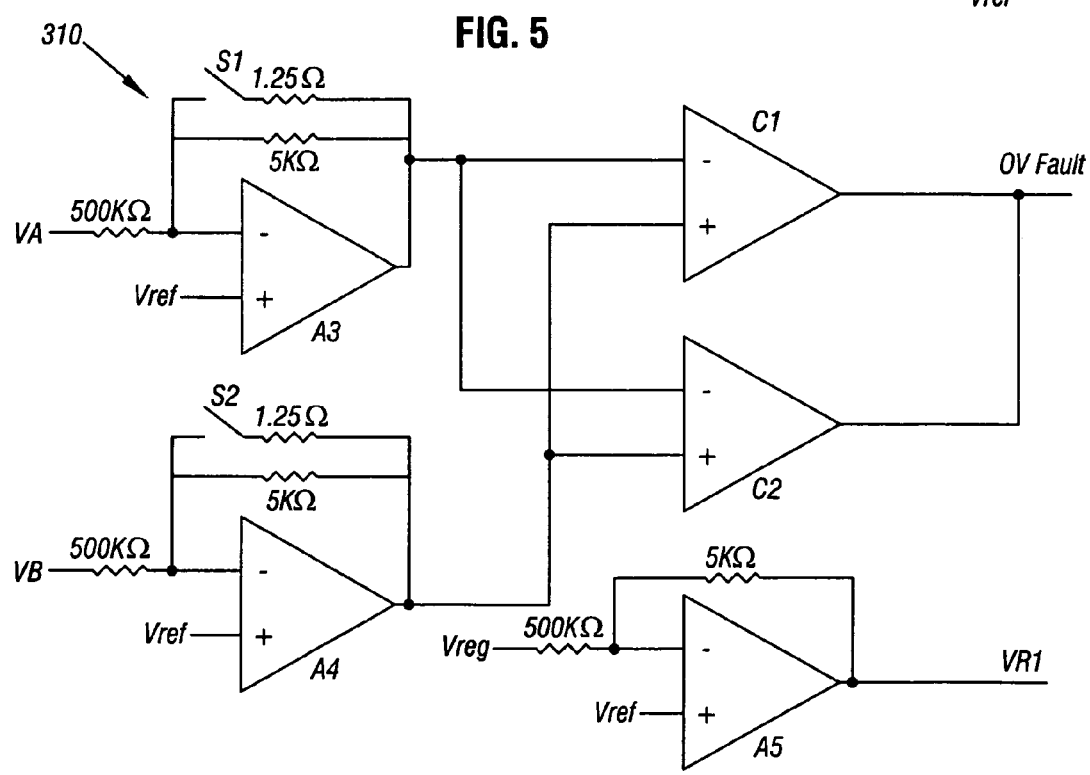
FIG. 6 is a schematic diagram of an overvoltage fault detector in accordance with an embodiment of the present invention.

Referring now to FIG. 6, shown is a schematic diagram of an overvoltage fault detector in accordance with an embodiment of the present invention. As shown in FIG. 6, circuit 310 may be used for voltage sense amplification and overvoltage fault detection. Specifically, input op-amps A3-A5 are coupled to receive incoming voltages representative of the tip, ring and battery voltages, i.e., tip (VA), ring (VB) and VBATT (VREG). In one embodiment, op-amps A3-A5 may have a nominal gain of 1/100 with the output voltages VA1, VB1, and VR1 referenced to $V_{REF}$. In the embodiment of FIG. 6, each incoming voltage may be coupled through an external 500 kΩ resistor to the negative input terminal of the corresponding op-amp, while a 5 kΩ feedback resistor may be coupled between output of the op-amp and the negative input terminal. Note that op-amps A3 and A4 corresponding to the tip and ring sense amplifiers may further include switchable shunt resistors RS1 and RS2 of, e.g., 1.25 kΩ, controlled by switches S1 and S2. These shunt resistors may be switched in to reduce the gain to 1/500 to measure line fault voltages of up to plus or minus 500 V. In various embodiments, the fault detection circuitry implemented via op-amps C1 and C2 may be triggered under normal conditions when tip or ring voltages exceed +50 V or −100 V, in some embodiments. Accordingly, in these instances, the outputs of op-amp C1 or C2 may generate an overvoltage fault signal, i.e., OV Fault. Note that sense op-amps A3-A5 may have a nominal gain of 1/100 to allow sensing of signals in excess of −100 V with a 3.30 V supply to op-amp A3-A5.

Figure 7:
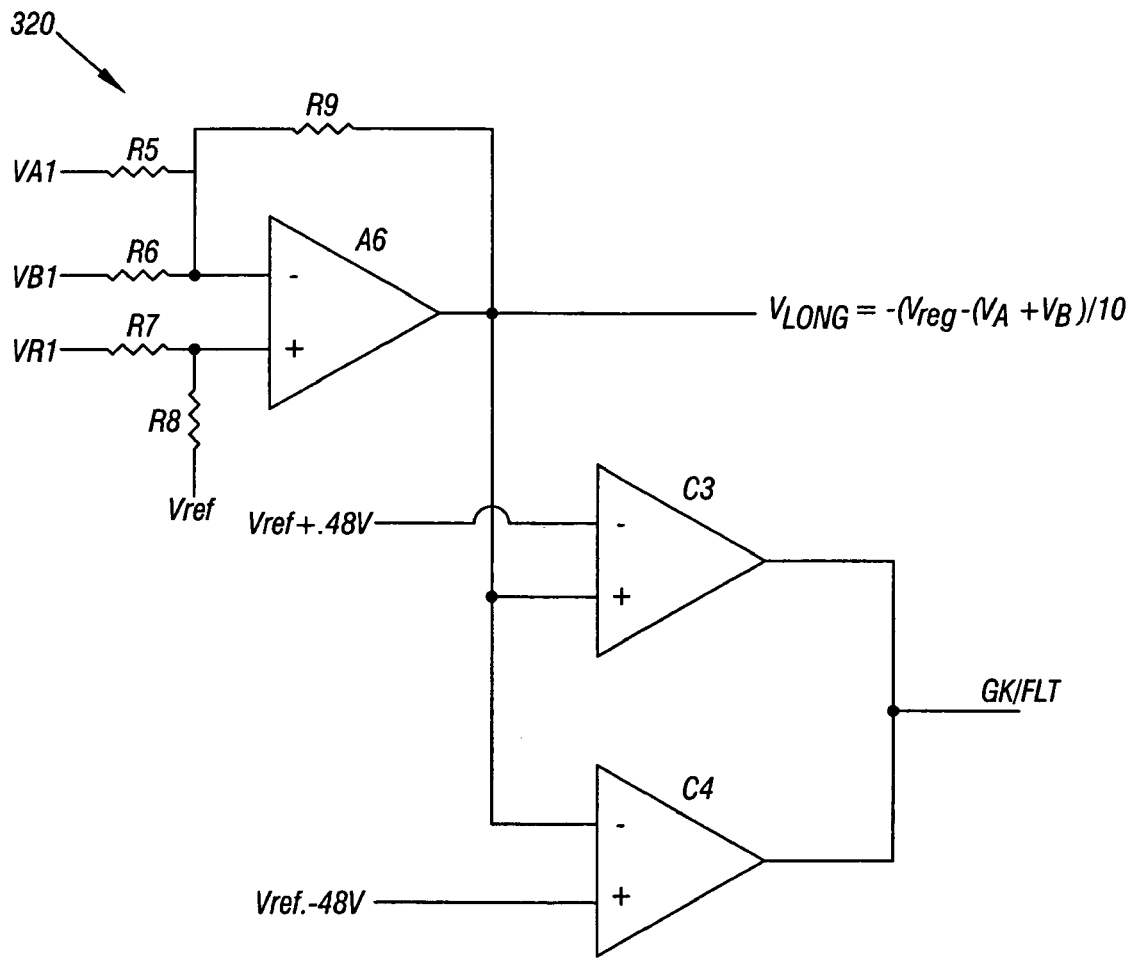
FIG. 7 is a schematic diagram of a longitudinal control loop in accordance with an embodiment of the present invention.

Low voltage control circuitry in accordance with an embodiment of the present invention may further be used to perform longitudinal loop and ground key detection. Referring now to FIG. 7, shown is a schematic diagram of a longitudinal control loop in accordance with an embodiment of the present invention. As shown in FIG. 7, circuit 320 may be used to generate a longitudinal voltage, $V_{long}$, which may be a control signal referenced to $V_{REF}$. As indicated above, this longitudinal control voltage may provided as an input to a high voltage stage for use in generation of tip and ring voltages. In the embodiment of FIG. 7, op-amp A6 is coupled to receive the sensed tip and ring voltages (VA1 and VB1) through input resistors R5 and R6, which may be 10 kΩ resistors, in one embodiment via a negative input terminal, while a positive input terminal is coupled to receive the sensed battery voltage (VR1), fed through an input resistor R7, e.g., of 11 kΩ, with an additional reference voltage, $V_{REF}$, coupled to the positive input terminal via a resistor R8, which may be 10 kΩ in one embodiment. Additionally, a feedback resistor R9, which may be 100 kΩ in one embodiment, may be coupled between the output of op-amp A6 and the negative input terminal. The output of op-amp A6 may thus correspond to the longitudinal control voltage which may be equal to (VR1−(VA1+VB1))/10 [1].

This longitudinal voltage may be provided to high voltage circuitry. Furthermore, as shown in FIG. 7 the output of op-amp A6, $V_{long}$, may be coupled to a pair of op-amps C3 and C4, and more particularly to the positive input terminal of op-amp C3 and the negative input terminal of C4. Reference voltages, e.g., obtained from the bias generator of FIG. 5, may be coupled to the corresponding opposite polarity input terminals. The outputs of op-amps C3 and C4 may be combined to provide a ground key or longitudinal fault detection signal via this dual comparator circuit formed of op-amps C3 and C4.

Figure 8:
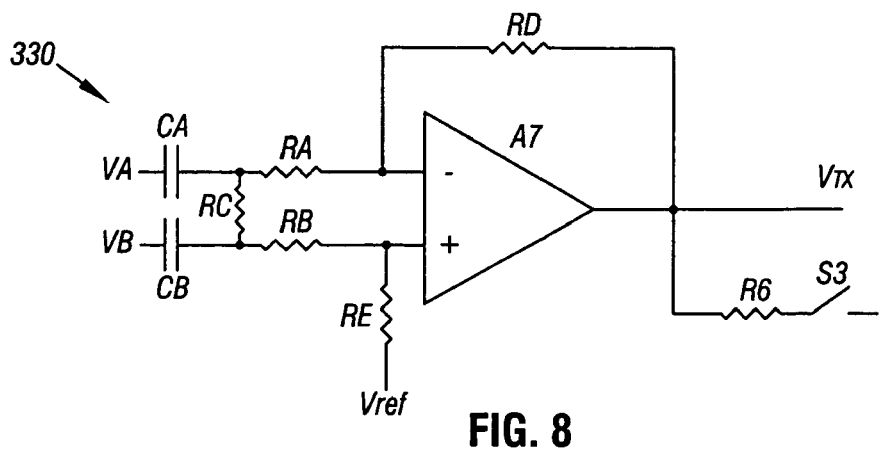
FIG. 8 is a schematic diagram of a VTX circuit in accordance with one embodiment of the present invention.

Referring now to FIG. 8, shown is a schematic diagram of a VTX circuit in accordance with one embodiment of the present invention. As shown in FIG. 8, circuit 330 may be used to provide a difference signal referenced to $V_{REF}$. Specifically, incoming tip and ring voltages, VA and VB, respectively may be AC-coupled through a pair of capacitors CA and CB (which may be 80 nF, in one embodiment) and coupling resistor RC (which may be 100 kΩ) through a pair of front end resistors RA and RB to the negative and positive input terminals, respectively, of an op-amp A7 having a feedback resistor RD (e.g., of 66.7 kΩ) coupled between the output and negative input terminal. Note a reference voltage $V_{REF}$ may be coupled to the positive input terminal via a resistor RE (which may be 66.7 kΩ). The output of op-amp A7, VTX, may thus be a difference signal representative of the difference between tip and ring voltages. Note that in various embodiments, this value may be provided as a feedback signal to a high voltage front end portion of SLIC circuitry through a resistor RF (which may be 20 kΩ) and via switch S3 in all active voice states.

Figure 9:
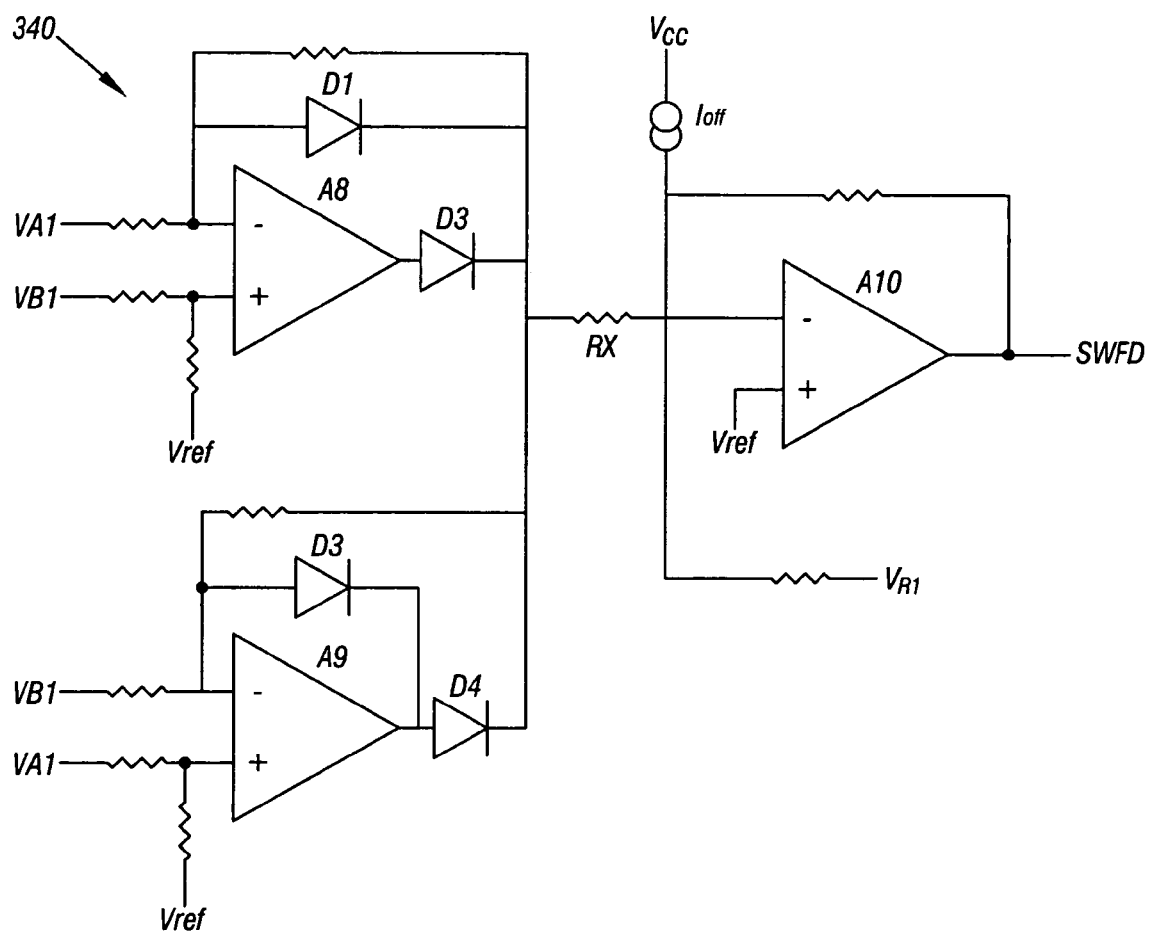
FIG. 9 is a schematic diagram of a regulator control circuit in accordance with an embodiment of the present invention.

In various embodiments, low voltage circuitry may be used to generate a control signal for use in controlling a switching regulator that provides power to the SLIC. Referring now to FIG. 9, shown is a schematic diagram of a regulator control circuit in accordance with an embodiment of the present invention. As shown in FIG. 9, circuit 340 may include a pair of front end op-amps A8 and A9, each coupled to receive the sensed tip and ring voltages, VA1 and VB1. Op-amps A8 and A9, along with their feedback diodes D1 and D2 and output diodes D3 and D4 may provide a full-wave rectifier for the differential voltage between the sensed tip and ring voltages. This output may be coupled through a resistor RX to an op-amp A10 which may compare the differential voltage plus an offset voltage generated via a current source $I_{OFF}$ and the scaled battery voltage $V_{R1}$, to a reference voltage, $V_{REF}$, to generate a control signal, namely a switching feed signal (SWFD) to control the switching regulator. Of course, other implementations of a regulator controller may be realized in different embodiments.

Figure 10:
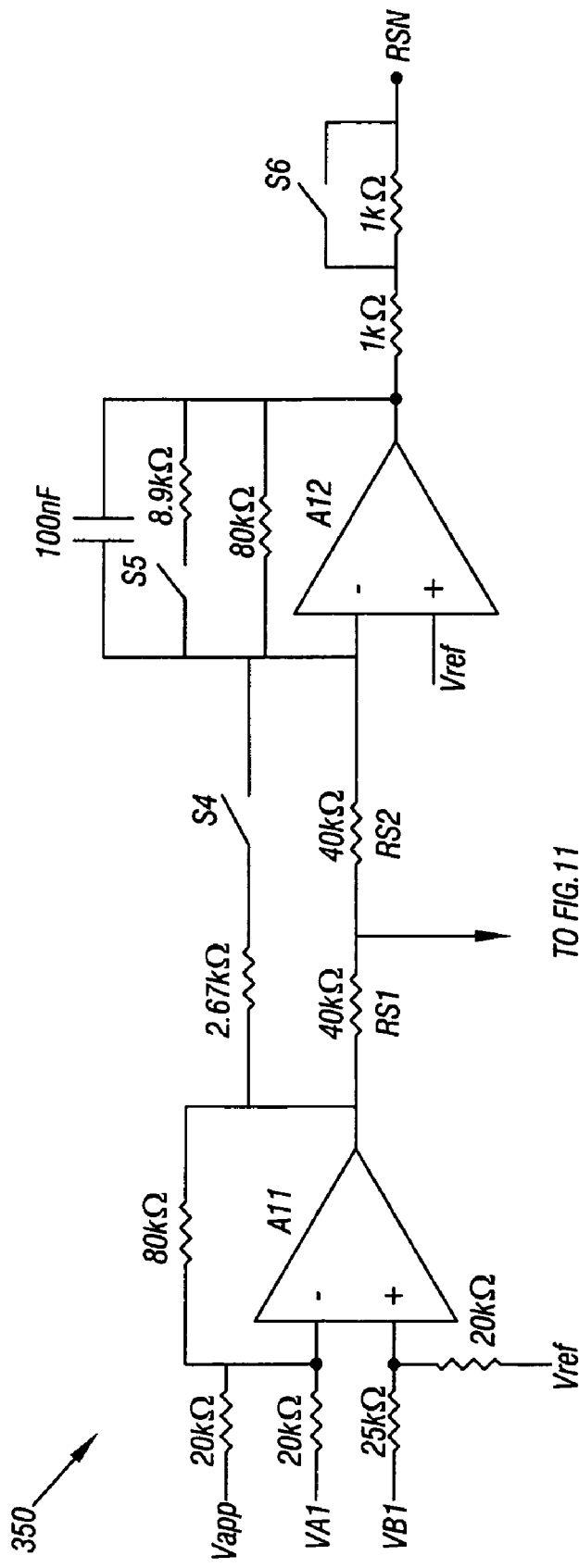
FIG. 10 is schematic diagram of a DC feed circuit in accordance with an embodiment of the present invention.

In various embodiments, a DC feed circuit to provide a metallic current input to a high voltage front end may also be implemented in low voltage circuitry. Referring now to FIG. 10, shown is a schematic diagram of a DC feed circuit in accordance with an embodiment of the present invention. As shown in FIG. 10, circuit 350 may be adapted to compare the sensed tip and ring voltages provided to the negative and positive input terminals, respectively of an op-amp A11 to an open circuit voltage. More specifically, a voltage, $V_{APP}$, which may be a scaled version of a DC open circuit voltage (or a ringing voltage during ringing) may be coupled to the negative input terminal for comparison in op-amp A11. The output of op-amp A11 may then be coupled through a pair of series resistors RS1 and RS2 to an op-amp A12, where the signal may be amplified and provided, e.g., to the high voltage front end as a metallic input signal via a terminal RSN. Note that a filter capacitor may be coupled across op-amp A12 to remove AC signaling influence. Furthermore, a plurality of switches S4, S5, and S6 may be coupled as shown in FIG. 10 to change the gain and frequency response of circuit 350 during ringing mode. As further shown in FIG. 10, note that a node between the series resistors RS1 and RS2 may be provided to a current limit circuit, which in turn may be used to limit the maximum current in the DC feed. Note that the representative values for various input and feedback resistors in this figure and the other figures are exemplary, and other values may be used in different embodiments.

Figure 11:
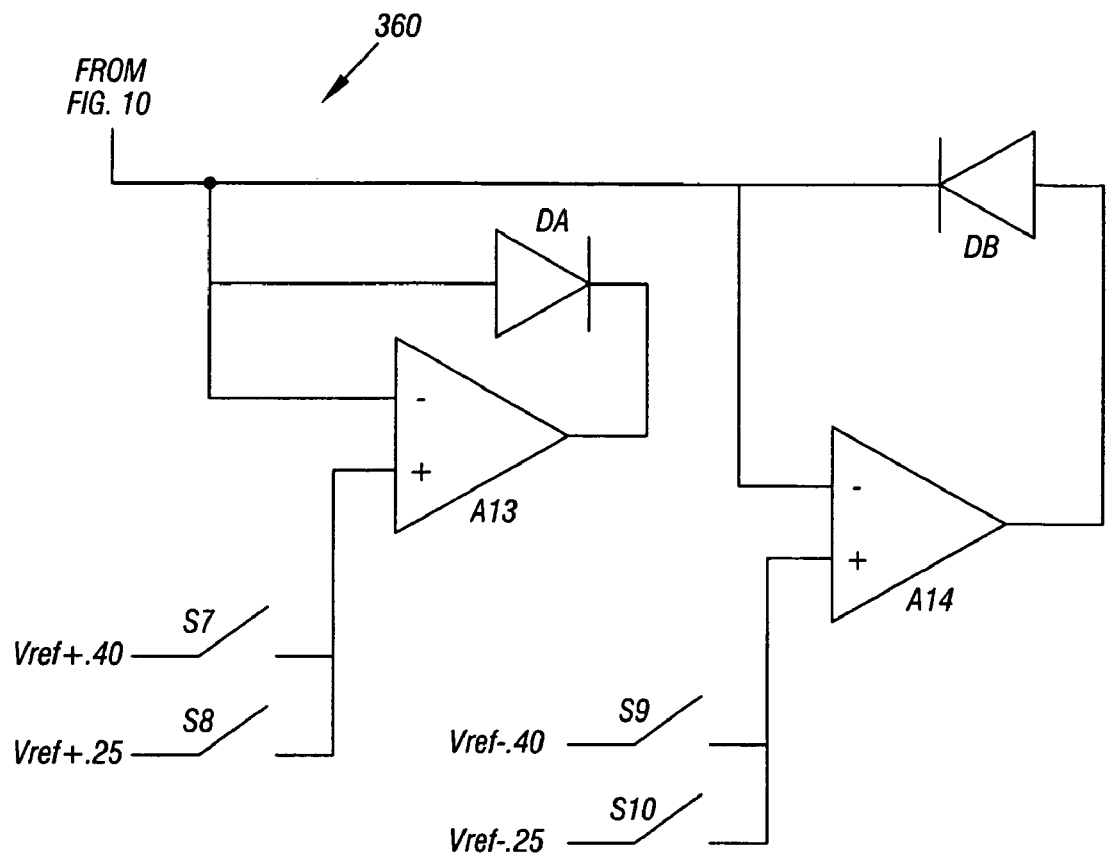
FIG. 11 is a schematic diagram of a current limit circuit in accordance with an embodiment of the present invention.

Referring now to FIG. 11, shown is a schematic diagram of a current limit circuit in accordance with an embodiment of the present invention. As shown in FIG. 11, current limit circuitry 360 may be coupled to receive the voltage present at the node between series resistors RS1 and RS2 of DC feed circuit 350 of FIG. 10. This voltage may be coupled to the negative input terminals of a pair of op-amps A13 and A14. Op-amps A13 and A14 have positive input terminals coupled to receive a programmable input voltage selected from a given reference voltage, e.g., from the bias circuit of FIG. 5, and outputs coupled to diodes DA and DB. Specifically, based on a level of the incoming voltage to the negative input terminal a selected one of switches S7 or S8 and S9 or S10 may be active to enable a given reference voltage to be sent to the positive input terminal of the respective op-amp. In this way, circuitry 360 may be active when the input voltage is less than the threshold but circuitry 360 may effectively clamp the input voltage to the threshold voltage. Thus if this input voltage tries to rise above the threshold, the DC feed voltage at the output of op-amp A12 will be effectively limited by current limiter 360. Accordingly, the DC feed current, i.e., the metallic current may be effectively limited to a predetermined level.

Figure 12:
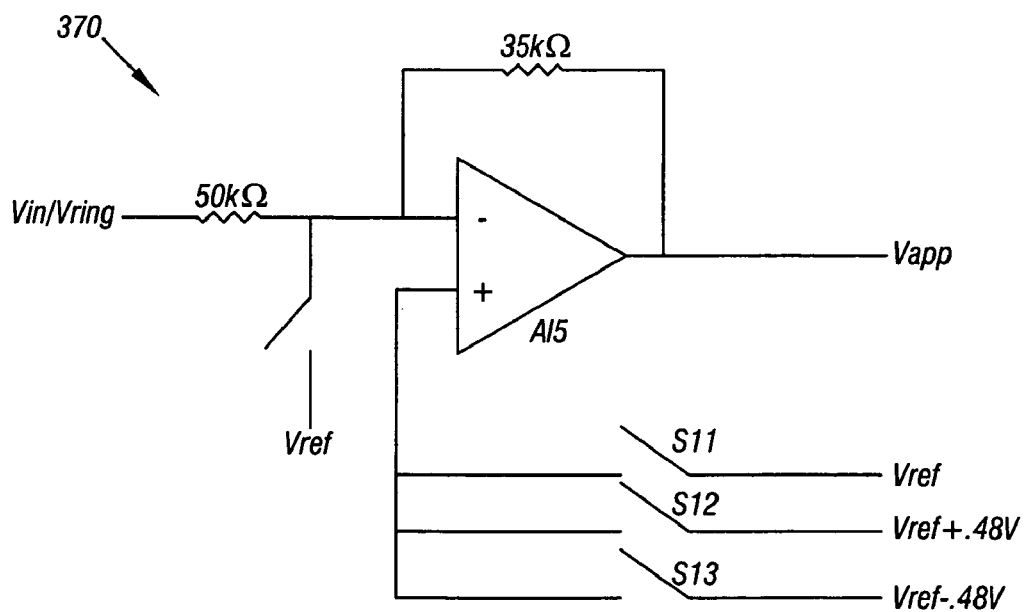
FIG. 12 is a schematic diagram of a voltage generator in accordance with an embodiment of the present invention.

The reference signal $V_{APP}$ used in DC feed circuit 350 may be generated using a circuit 370 shown in FIG. 12. Specifically, as shown in FIG. 12, circuit 370 may have an op-amp A15 having a negative input terminal coupled to receive a DC open circuit voltage (e.g., +/−48 V scaled by 100 to 0.48 V or −0.48 V) or a scaled version of a ringing signal. This value may be compared to a selected reference voltage dictated by one or more of switches S11-S13 such that the output of op-amp A15 generates the $V_{APP}$ signal. Note that when S12 or S13 is closed, the other input to op-amp A 15 is connected $V_{REF}$. When S11 is closed, the other input to op-amp A15 is connected through a 50 kΩ resistor to Vin/Vring.

Figure 13:
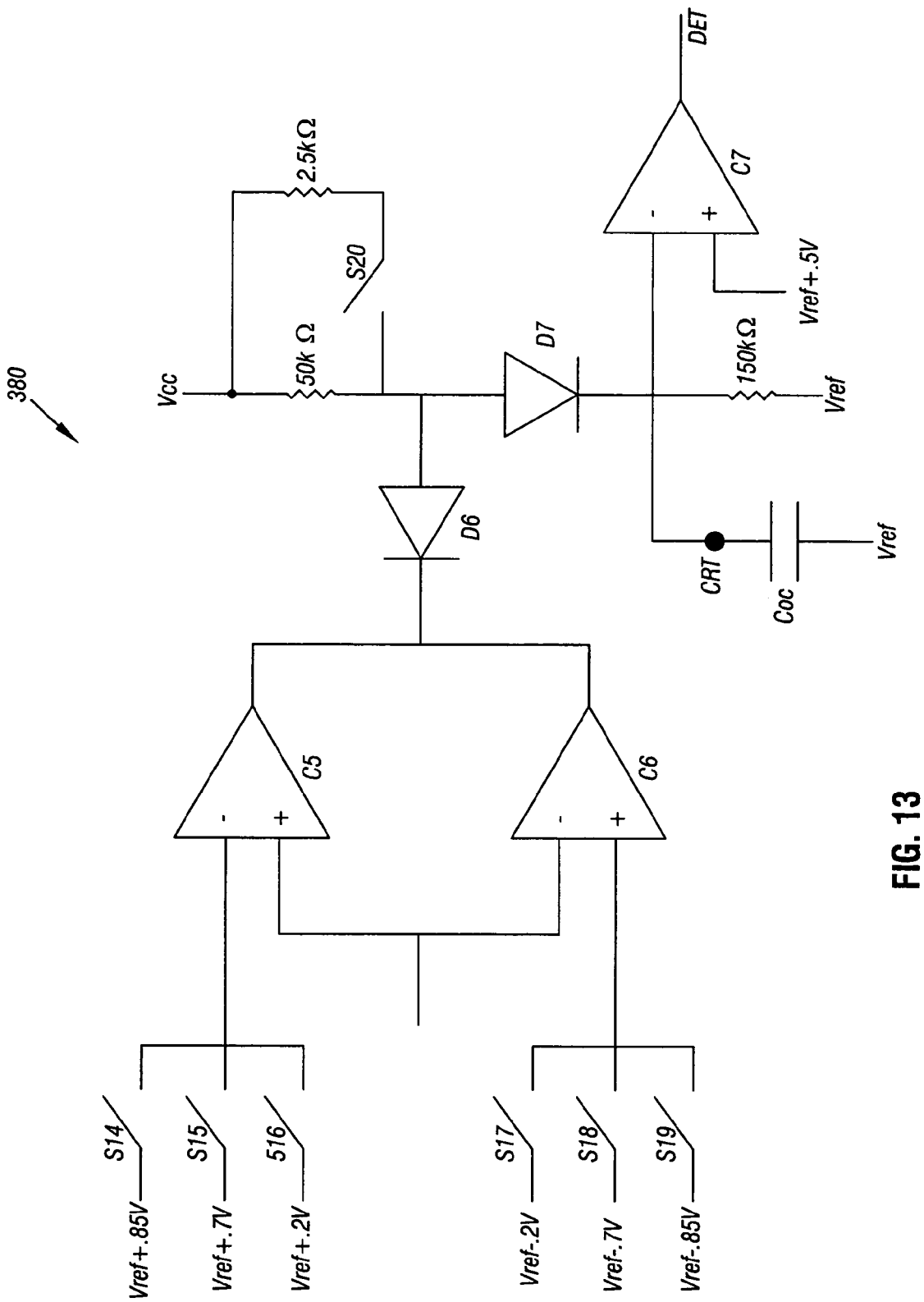
FIG. 13 is a schematic diagram of a hook detector in accordance with an embodiment of the present invention.

In some embodiments, hook switch and ring trip detection may further be performed using low voltage circuitry. Referring now to FIG. 13, shown is a schematic diagram of a hook detector in accordance with an embodiment of the present invention. As shown in FIG. 13, circuit 380 may include a pair of front end op-amps C5 and C6 having a negative input terminal and a positive input terminal, respectively coupled to receive a selected one of a set of programmable thresholds. These threshold values may be obtained, e.g., using the bias circuit of FIG. 5. The selected reference voltage may be coupled in through a given one of switches S14-S19 and compared to a voltage, which may be proportional to the DC feed current (e.g., generated by the DC feed block of the output of op-amp A 12 of FIG. 10). In ringing, the signal will be bi-directional such that the outputs of op-amps C5 and C6 may be combined, fed through diodes D6 and D7 having a variable voltage at a node therebetween based on switch S20 and filtered via, e.g., an off-chip capacitor, which may be 390 nF in one embodiment, coupled at a terminal CRT to a negative input terminal of an op-amp C7 which compares the combined output of op-amps C5 and C6 as filtered to a reference voltage to provide a detection signal, DET for ring trip detection.

Figure 14:
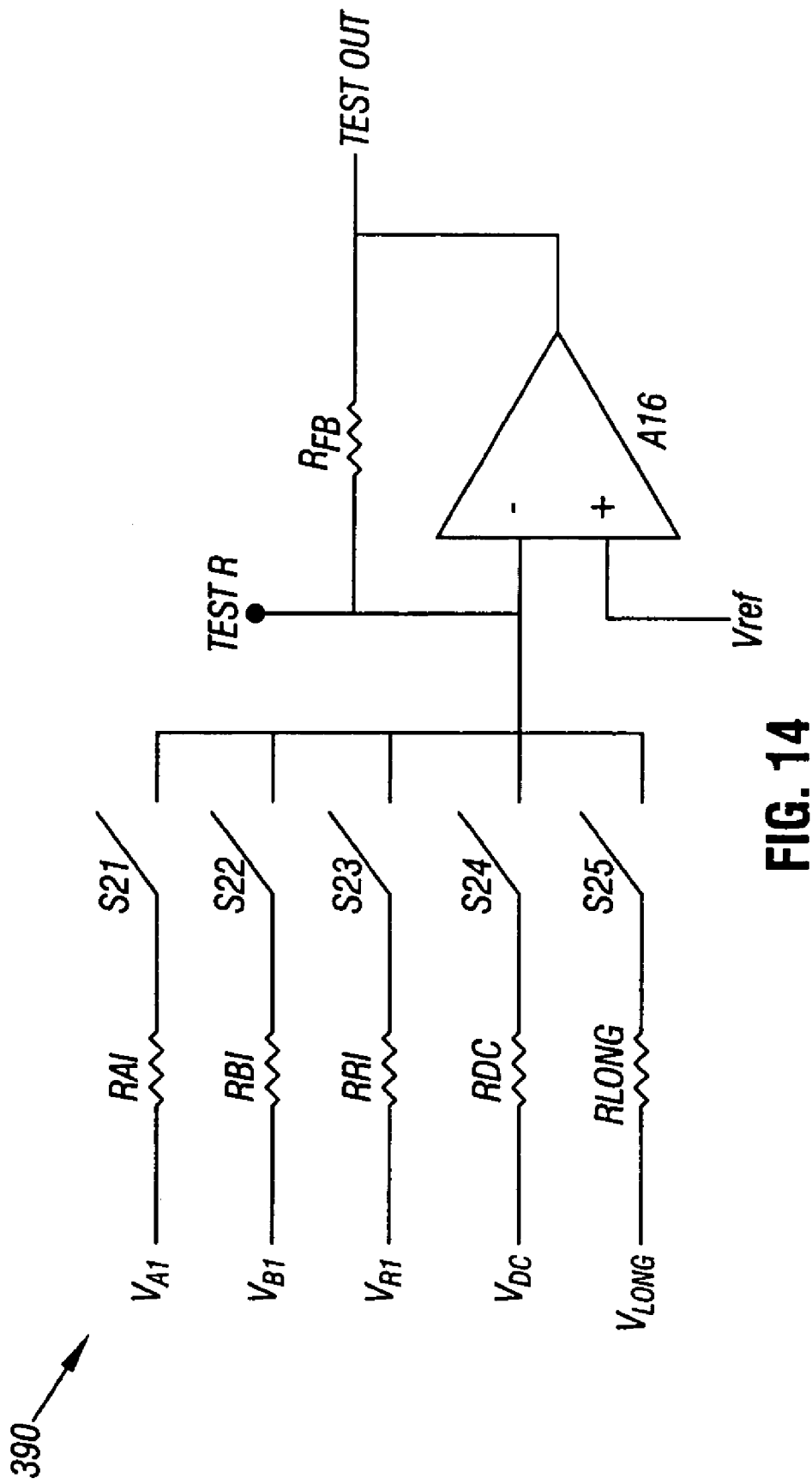
FIG. 14 is a schematic diagram of a test circuit in accordance with one embodiment of the present invention.

Embodiments may further be used to perform testing of various voltage values via a single op-amp implemented in low voltage circuitry. Referring now to FIG. 14, shown is a schematic diagram of a test circuit 390 in one embodiment of the present invention. As shown in FIG. 14, circuit 390 may include an op-amp A16 having a negative input terminal coupled to receive a selected voltage level. Specifically in the embodiment of FIG. 14 a plurality of switches S21-S25 may be present, each of which is selectable to provide a given voltage to the negative input terminal of op-amp A16 through a given resistor. Note that the negative input terminal further has a feedback resistor RFB coupled between the output and negative input terminal. Accordingly, circuit 390 may allow multiplexing of sensed tip and ring voltages, along with the sensed battery voltage. Still further, voltages representative of the DC metallic current and the longitudinal current may further be compared to a reference voltage, $V_{REF}$. The output of op-amp A16 may be provided as a test out signal, which may be provided to additional low voltage control circuitry to enable improved control of these voltages. While shown with this particular implementation in the embodiment of FIG. 14, other implementations may provide other test circuitry.

Figure 15:
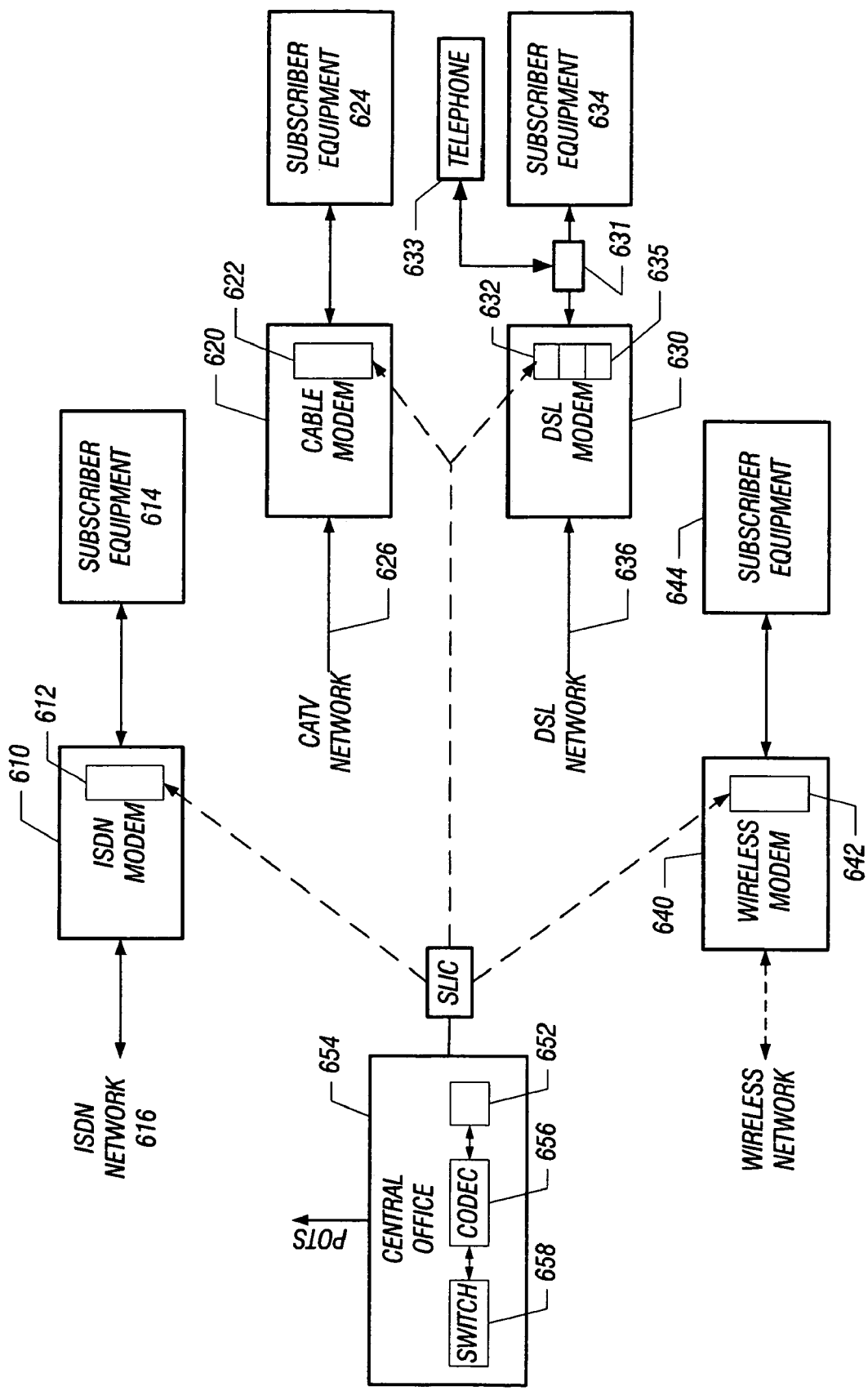
FIG. 15 is a block diagram illustrating various short and long loop applications for a SLIC.

In some applications a SLIC in accordance with an embodiment of the present invention may be used in a central telephone exchange that communicates with subscriber equipment using the POTS ("plain old telephone system") interface. Such an implementation is shown in FIG. 15, which shows illustrations of various long and short loop applications for a SLIC. As shown in FIG. 15 one application of a SLIC is in connection with a central office. Specifically, central office 654 includes a SLIC 652 which is coupled to a POTS interface. In turn, SLIC 652 is coupled to a CODEC 656 and a switch 658. Of course, other implementations are possible. Other SLIC applications include private exchanges and short loop applications. Short loop applications often have a relatively short distance subscriber loop between the subscriber equipment and the SLIC. This is often the case when subscriber equipment interfaces with a non-POTS system such as a network that uses different communication media or protocols.

As shown in FIG. 15, in one embodiment, a SLIC 612 is used in an Integrated Services Digital Network (ISDN) modem 610. ISDN modem 610 provides bidirectional communication between subscriber equipment 614 and the ISDN network 616. In another embodiment, SLIC 622 is used in cable modem 620. In one embodiment, cable modem 620 communicates information using the community antenna television (CATV) network 616. SLIC 622 may enable cable modem 620 to communicate information from the coaxial CATV cable 626 to subscriber equipment 624. In another example, digital subscriber line (DSL) modem 630 incorporates a SLIC 632 and a DSL interface 635 for communication with digital subscriber line 636. In turn, DSL modem 630 is coupled to a splitter 631, which in turn is coupled to subscriber equipment 634, e.g., a computer system for communication of digital data at high speeds. Furthermore, splitter 631 couples to a telephone 633 for communication of voice data. Another example includes wireless applications such as wireless modem 640 including a SLIC 642 that in turn is coupled between a wireless network and subscriber equipment 644. Of course, other applications are possible. Unlike the central exchange applications, the short loop applications may enable the design of SLICs having relaxed performance characteristics. In particular, a short loop application SLIC need not necessarily meet typical POTS standards if the subscriber equipment is not actually connected to the public telephone network.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a low voltage subscriber line interface circuit (SLIC) to control a plurality of SLIC functions at a low voltage, the low voltage SLIC including:
a voltage detection circuit having a first pair of operational amplifiers each to receive one of a tip and ring voltage of a subscriber loop and output a scaled version; and
a second pair of operational amplifiers each coupled to receive the scaled versions of the tip and ring voltages and to generate an overvoltage signal if the tip voltage or ring voltage is greater than a predetermined threshold.

2. The apparatus of claim 1, wherein the voltage detection circuit further comprises a switchable shunt resistance coupled between the inputs and outputs of each of the first pair of operational amplifiers, the switchable shunt resistance controllably switched into the voltage detection circuit if the tip voltage or ring voltage is greater than a trigger level.

3. The apparatus of claim 1, wherein the low voltage SLIC further comprises a longitudinal voltage controller including a first operational amplifier to receive the scaled versions of the tip and ring voltages at a first input and a scaled battery voltage at a second input, the first operational amplifier to generate a longitudinal voltage for use by a high voltage SLIC coupled to the low voltage SLIC.

4. The apparatus of claim 3, wherein the low voltage SLIC further comprises a third pair of operational amplifiers coupled to the output of the first operational amplifier, wherein the third pair of operational amplifiers is to generate a fault signal based on comparison of the longitudinal voltage to a first threshold and a second threshold.

5. The apparatus of claim 1, wherein the low voltage SLIC further comprises a bias generator to generate a plurality of low voltages, the bias generator including a first low voltage operational amplifier having an output coupled to a first resistor string to generate a plurality of positive reference voltages and a second low voltage operational amplifier coupled to the output of the first low voltage operational amplifier and having an output coupled to a second resistor string to generate a plurality of negative reference voltages.

6. The apparatus of claim 5, further comprising an external resistor coupled to a first input of the first low voltage operational amplifier and a reference voltage coupled to a second input of the first low voltage operational amplifier, wherein the external resistor is to track on-chip sheet resistance of the first resistor string.

7. The apparatus of claim 1, wherein the low voltage SLIC further comprises a DC feed circuit to provide a metallic control current to a high voltage SLIC coupled to the low voltage SLIC, wherein the DC feed circuit comprises:
a first operational amplifier to receive the scaled versions of the tip and ring voltages to compare to a voltage representative of a DC open circuit voltage or a ringing voltage of the subscriber loop; and
a second operational amplifier having a first input coupled to an output of the first operational amplifier to amplify the output of the first operational amplifier to generate the metallic control current.

8. The apparatus of claim 7, further comprising a current limiter coupled between the output of the first operational amplifier and the first input of the second operational amplifier to limit the metallic control current, wherein the current limiter comprises a fourth pair of operational amplifiers each to receive the output of the first operational amplifier and a programmable reference voltage.

9. The apparatus of claim 8, wherein the current limiter is to limit the first input of the second operational amplifier of the DC feed circuit to a value of a selected one of a plurality of programmable reference voltages.

10. The apparatus of claim 7, further comprising a plurality of switchable resistances to be switched into the DC feed circuit during a ringing mode of the high voltage SLIC.

11. An apparatus comprising:
a low voltage subscriber line interface circuit (SLIC) to perform a plurality of SLIC functions at a low voltage and to provide a metallic current and a longitudinal current to a high voltage SLIC, wherein the low voltage SLIC includes a plurality of circuits to perform the SLIC functions, wherein each of the plurality of circuits is based on an operational amplifier cell architecture; and
the high voltage SLIC coupled to the low voltage SLIC to receive the metallic current and the longitudinal current and to generate a first amplified output current and a second amplified output current from the metallic current and the longitudinal current, the high voltage SLIC comprising:
a first bidirectional current amplifier formed of a first pair of unidirectional current amplifiers; and
a second bidirectional current amplifier formed of a second pair of unidirectional current amplifiers.

12. The apparatus of claim 11, wherein a first one of the plurality of circuits comprises a longitudinal voltage controller including a first operational amplifier to receive scaled versions of tip and ring voltages of a subscriber loop at a first input and a scaled battery voltage at a second input, the first operational amplifier to generate a longitudinal voltage for use by the high voltage SLIC.

13. The apparatus of claim 12, wherein a second one of the plurality of circuits comprises a voltage detection circuit having a first pair of operational amplifiers each to receive one of the tip and ring voltage and output the scaled version and a second pair of operational amplifiers coupled to receive the scaled versions of the tip and ring voltages and to generate an overvoltage signal if the tip voltage or ring voltage is greater than a predetermined threshold.

14. The apparatus of claim 13, wherein the second one of the plurality of circuits further comprises a longitudinal voltage controller including a third operational amplifier to receive the scaled versions of the tip and ring voltages at a first input and a scaled battery voltage at a second input, the third operational amplifier to generate the longitudinal voltage.

15. The apparatus of claim 13, wherein a third one of the plurality of circuits comprises a DC feed circuit to provide a metallic control current to the high voltage SLIC, the DC feed circuit including a fourth operational amplifier to receive the scaled versions of the tip and ring voltages to compare to a voltage representative of a DC open circuit voltage or a ringing voltage of the subscriber loop, and a fifth operational amplifier having a first input coupled to an output of the fourth operational amplifier to amplify the output of the fourth operational amplifier to generate the metallic control current.

16. The apparatus of claim 11, wherein the low voltage SLIC and the high voltage SLIC are formed on a single substrate of an integrated circuit.

17. The apparatus of claim 11, further comprising an analog interface to couple the low voltage SLIC and the high voltage SLIC, wherein the analog interface comprises a three-wire interface.

18. The apparatus of claim 17, wherein the high voltage SLIC is to interface with system chips of different process technologies via the analog interface.

19. A system comprising:
a digital signal processor (DSP) to perform signal processing on voiceband communication signals, the DSP coupled between a central office and a subscriber loop, the DSP including a circuit block to perform a plurality of low voltage subscriber line interface circuit (SLIC) functions, each of the low voltage SLIC functions performed by circuits having an operational amplifier-based cell architecture, wherein a first circuit of the circuit block comprises a switching regulator feedback controller having a first pair of low voltage operational amplifiers each to receive scaled versions of tip and ring voltages of the subscriber loop, the first pair of low voltage operational amplifiers having outputs coupled to a first input of a third low voltage operational amplifier, the third low voltage operational amplifier to output a control signal for the switching regulator; and
a high voltage SLIC coupled to the DSP via an analog interface, the high voltage SLIC including a first current amplifier and a second current amplifier to amplify currents received from the circuit block via the analog interface, wherein an output of the high voltage SLIC is coupled to the subscriber loop.

20. The system of claim 19, further comprising a current source to provide an offset current to the first input of the third low voltage operational amplifier, the first input further coupled to receive a scaled battery voltage.

21. The system of claim 19, wherein a second circuit of the circuit block comprises a ring detector to detect off hook and ringing modes on the subscriber loop, the ring detector including:
a second pair of low voltage operational amplifiers each to receive one of a set of programmable reference voltages and an input signal, and to output a bidirectional signal in the ringing mode; and
a fourth low voltage operational amplifier having a first input to receive a filtered version of the bidirectional signal and to output a detection signal.

* * * * *